United States Patent
Ait-Mokhtar et al.

(10) Patent No.: US 10,169,454 B2
(45) Date of Patent: Jan. 1, 2019

(54) UNSUPERVISED ONTOLOGY-BASED GRAPH EXTRACTION FROM TEXTS

(71) Applicant: Xerox Corporation, Norwalk, CT (US)

(72) Inventors: Salah Ait-Mokhtar, Montbonnot-Saint-Martin (FR); Vassilina Nikoulina, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 298 days.

(21) Appl. No.: 15/156,623

(22) Filed: May 17, 2016

(65) Prior Publication Data
US 2017/0337268 A1 Nov. 23, 2017

(51) Int. Cl.
G06F 17/30 (2006.01)
G06F 7/00 (2006.01)
G06N 5/02 (2006.01)

(52) U.S. Cl.
CPC .. G06F 17/30734 (2013.01); G06F 17/30684 (2013.01); G06F 17/30731 (2013.01); G06F 17/30958 (2013.01); G06N 5/02 (2013.01)

(58) Field of Classification Search
CPC ........ G06F 17/30734; G06F 17/30731; G06F 17/30958; G06F 17/30684; G06N 5/02
USPC ........................................... 707/794; 706/19
See application file for complete search history.

(56) References Cited

U.S. PATENT DOCUMENTS

| | | | |
|---|---|---|---|
| 7,027,974 B1 * | 4/2006 | Busch | G06F 17/271 704/4 |
| 7,058,567 B2 | 6/2006 | Aït-Mokhtar et al. | |
| 2003/0177112 A1 * | 9/2003 | Gardner | G06F 19/28 |
| 2006/0036592 A1 * | 2/2006 | Das | G06F 17/30418 |
| 2009/0012842 A1 * | 1/2009 | Srinivasan | G06F 17/2785 705/12 |
| 2009/0228507 A1 * | 9/2009 | Jain | G06F 17/2705 |
| 2011/0078104 A1 * | 3/2011 | Honkola | G06N 5/022 706/47 |

(Continued)

OTHER PUBLICATIONS

Aït-Mokhtar, et al., "Robustness beyond shallowness: incremental dependency parsing," in special issue of the NLE Journal, pp. 1-24 (2002).

(Continued)

*Primary Examiner* — David T. Brooks
(74) *Attorney, Agent, or Firm* — Fay Sharpe LLP

(57) ABSTRACT

A method for extracting a relations graph uses an ontology graph in which nodes represent entity classes or concepts and edges represent properties of the classes. A property is associated with a constraint which defines a range of values that can be taken without incurring a cost. Input text in which entity and concept mentions are identified is received. An optimal set of alignments between a subgraph of the ontology graph and the identified mentions is identified by optimizing a function of constraint costs incurred by the alignments and a distance measure computed over the set of alignments. The relations graph is generated, based on the optimal set of alignments. The relations graph represents a linked set of relations instantiating a subgraph of the ontology. The relations graph can include relations involving implicit mentions corresponding to subgraph nodes that are not aligned to any of the concept or entity mentions.

18 Claims, 4 Drawing Sheets

(56) References Cited

U.S. PATENT DOCUMENTS

| | | | | |
|---|---|---|---|---|
| 2011/0196670 | A1* | 8/2011 | Dang | G06F 17/2785 704/9 |
| 2013/0013580 | A1* | 1/2013 | Geller | G06F 17/30672 707/706 |
| 2013/0013645 | A1* | 1/2013 | Dias | G06F 17/30675 707/794 |
| 2013/0018828 | A1* | 1/2013 | He | G06N 5/022 706/12 |
| 2014/0163955 | A1* | 6/2014 | Ng Tari | G06F 17/2785 704/9 |
| 2014/0280353 | A1* | 9/2014 | Delaney | G06F 17/30734 707/794 |
| 2015/0309992 | A1* | 10/2015 | Visel | G06F 17/2785 704/9 |
| 2016/0117325 | A1* | 4/2016 | Galle | G06F 17/30734 707/749 |
| 2016/0147736 | A1* | 5/2016 | Danielyan | G06F 17/2785 704/9 |
| 2017/0046425 | A1* | 2/2017 | Tonkin | G06F 17/30684 |

OTHER PUBLICATIONS

Aït-Mokhtar, et al., "EURECA Deliverable 3.1 Initial prototype for concept extraction out of EHR free text," Technical report, pp. 1-27 (2013).
Brun, et al., "Normalization and paraphrasing using symbolic methods," ACL: 2nd Int'l Workshop on Paraphrasing, Paraphrase Acquisition and Applications, pp. 41-48 (2003).
Carlson, et al., "Coupled Semi-Supervised Learning for Information Extraction," *Proc. 3rd ACM Int'l Conf. on Web search and data mining (WSDM '10)*, pp. 101-110 (2010).
Daraselia, et al., "Extracting human protein interactions from MEDLINE using a full-sentence parser," *Bioinformatics*, 20(5):604-611 (2004).
Mackinlay, et al., "Extracting Biomedical Events and Modifications Using Subgraph Matching with Noisy Training Data," *Proc. BioNLP Shared Task 2013 Workshop*, pp. 35-44 (2013).
Mitchell, et al., "Never-Ending Learning," *Proc. 29th AAAI Conf. on Artificial Intelligence (AAAI-15)*, pp. 1-19 (2015).
Nédellec, et al., "Overview of BioNLP Shared Task 2013," *Proc. BioNLP Shared Task 2013 Workshop*, pp. 1-7 (2013).
Nie, et al., "Statistical Entity Extraction From the Web," *Proc. IEEE*, 100(9), pp. 2675-2687 (2012).
Poon, "Grounded Unsupervised Semantic Parsing," *ACL* (1), pp. 933-943 (2013).
Quan, et al., "An Unsupervised Text Mining Method for Relation Extraction from Biomedical Literature," *PLoS One*, 9, (2014).
Werling, et al., "Robust Subgraph Generation Improves Abstract Meaning Representation Parsing," *Proc. 53rd Annual Meeting of the Association for Computational Linguistics and the 7th International Joint Conference on Natural Language Processing of the Asian Federation of Natural Language Processing, ACL 2015*, vol. 1: Long Papers, pp. 982-991 (2015).
Zhou, et al., "Biomedical Relation Extraction: From Binary to Complex," *Comp. Math. Methods in Medicine*, pp. 1-20 (2014).

\* cited by examiner

UNSUPERVISED ONTOLOGY-BASED GRAPH EXTRACTION FROM TEXTS

BACKGROUND

Aspects of the exemplary embodiment relate to extracting graphs of relations from texts, and find particular application in connection with a system and method for extracting graphs based on an ontology of relations.

Graph extraction (GE), as used herein, entails the extraction of explicitly-structured sets of relations and attributes that link concepts and/or entities that either have (explicit) mentions, or which are implicitly referred to, in the input texts. GE can be useful for various applications, including automatic or semi-automatic population of databases (DBs) or knowledge bases (KBs), or for the generation of formal database or knowledge base queries from requirements or queries expressed in natural language.

It is widely acknowledged that annotating relations in the text is costly, and a number of attempts have been made to develop unsupervised or weakly supervised methods. In particular, some approaches try to exploit ontological constraints for reducing supervision. These approaches consider pairwise relations (a pair of mentions connected with a certain type of relation), as opposed to a graph of relations, and require examples for learning, either in the form of graph annotations in texts (regular supervision), or in the form of relations stored in a database or a knowledge base.

For example, in the Never-Ending Learning framework, the authors propose a semi-supervised method to learn simultaneously the categories and relations between categories from the web documents (see, T. Mitchell, et al. "Never-Ending Learning," *Proc. 29th AAAI Conf. on Artificial Intelligence (AAAI-15)*, 2015; and Andrew Carlson, et al., "Coupled Semi-Supervised Learning for Information Extraction," *Proc. 3rd ACM Int'l Conf on Web search and data mining (WSDM '10)*, pp. 101-110, 2010). This approach can extract only pairwise relations and requires a set of seed samples, since the approach is semi-supervised. Using a large corpus of web documents, the method relies on the existence of repeated patterns in the web documents in order to learn the most accurate relation patterns. It is thus not directed towards processing single documents.

In the case of extracting graphs of relations, existing systems are either rule-based or fully supervised. For example, a rule-based method is described in Nikolai Daraselia, et al., "Extracting human protein interactions from MEDLINE using a full-sentence parser," *Bioinformatics*, 20(5):604-611, 2004. In this method, an ontological graph is generated from a rich semantic parse of the sentence. The semantic parser is highly domain dependent, and closely related to the ontological structure to be produced. Thus, for each new domain, a semantic parser need to be generated, which is time consuming. A fully supervised method is described in Andrew MacKinlay, et al., "Extracting Biomedical Events and Modifications Using Subgraph Matching with Noisy Training Data," *Proc. BioNLP Shared Task* 2013 *Workshop*, pp. 35-44, 2013. The method aims to extract complex events in the context of BioNLP-2013 Cancer Genetics task. Syntactic dependency subgraph patterns that describe various events are learned from annotated training data. The extraction of new events is done using approximate subgraph matching between the learned subgraph patterns and the one observed in the input.

A method for statistical entity extraction from the Web, including the extraction of attributes of the entities, is described in Zaiqing Nie, et al., "Statistical Entity Extraction From the Web," *Proc. IEEE*, 100(9):2675-2687, 2012. The method extracts trees based on the definition of the entities and attributes to extract. However, the method requires training examples and extracts relations/attributes only for explicit text mentions.

A method for Abstract Meaning Representation (AMR) parsing is described in Keenon Werling, et al., "Robust Subgraph Generation Improves Abstract Meaning Representation Parsing," *Proc. 53rd Annual Meeting of the ACL and the 7th Int'l Joint Conf. on Natural Language Processing of the Asian Federation of Natural Language Processing, Vol. 1: Long Papers*, pp. 982-991, 2015. The supervised method uses annotated training examples and outputs a graph of nodes linked with relations. It only extracts relations/attributes for explicit text mentions.

Hoifung Poon, "Grounded Unsupervised Semantic Parsing," *ACL* (1), pp. 933-943, 2013, describes a method for "grounded unsupervised semantic parsing" for translating natural language queries into database queries. The method requires distant supervision and therefore requires labeled examples in a database for training. Once again, the method extracts relations/attributes only for explicit text mentions.

BRIEF DESCRIPTION

In accordance with one aspect of the exemplary embodiment, a method for extracting a relations graph includes providing an ontology of elements in the form of a graph in which nodes represent entity classes and edges connecting the nodes represent properties of the entity classes. At least one of the properties is associated with a constraint which defines a range of values for the respective property to take without incurring a cost. Input text in which entity mentions are identified is received. An optimal set of alignments between a subgraph of the ontology graph and the identified entity mentions in the input text is identified. The optimal set of alignments optimizes a function of the costs of the constraints incurred by the alignments in the set and a distance measure computed over the set of alignments. A relations graph is generated, based on the optimal set of alignments. The relations graph represents a linked set of relations instantiating the subgraph of the ontology. Where the subgraph of the ontology includes a node that is not aligned to any of the entity mentions, the relations graph includes an implicit mention corresponding to that subgraph node.

At least one of the identifying of the optimal set of alignments and the generating of the relations graph may be performed with a processor.

In accordance with another aspect of the exemplary embodiment, a system for extracting a relations graph includes memory which stores an ontology of elements in the form of a graph in which nodes represent entity classes and edges connecting the nodes represent properties of the entity classes. One or more of the properties is associated with a constraint which defines a range of values for the respective property to take without incurring a cost. A preprocessor identifies entity mentions in an input text. A graphing component generates a relations graph based on the identified entity mentions and the ontology. The graphing component includes an alignment component, a cost optimizer, and a relations graph generator. The alignment component generates alignments between entity mentions and the ontology. The cost optimizer identifies an optimal set of alignments between a subgraph of the ontology graph and at least a subset of the identified entity mentions in the input text. The optimal set of alignments is one which optimizes a function of the costs of the constraints incurred by the alignments in the set of alignments and a distance measure computed over the set of alignments. A relations graph generator generates a relations graph based on the optimal set of alignments. The relations graph represents a linked set of relations instantiating the subgraph of the ontology. If the subgraph of the ontology includes a node that is not aligned to any of the entity mentions, an implicit mention is included in the relations graph corresponding to that subgraph node. A processor implements the preprocessor, graphing component, alignment component, cost optimizer, and relations graph generator.

In accordance with another aspect of the exemplary embodiment, a method for extracting a relations graph includes providing an ontology in the form of a graph in which nodes represent entity classes and edges connecting the nodes represent properties of the entity classes. At least one of the properties is associated with a constraint which defines a range of values for the respective property to take without incurring a cost. Text is received in which entity mentions are identified. Alignments between each of the identified entity mentions and nodes of the ontology are identified, based on similarity between senses of the entity mentions and labels of the nodes. The ontology includes an artificial node for alignment with an entity mention that does not have a sense label which meets a threshold similarity with any of the labels of the nodes. An optimal set of the alignments is identified for a subgraph of the ontology. The optimal set of alignments optimizes a function of the costs of the constraints incurred by the alignments in the set and a multi-dimensional distance measure computed over the set of alignments. The subgraph of the ontology is instantiated as a relations graph, based on the optimal set of alignments. The relations graph includes nodes connected by edges, the nodes representing entity mentions and the edges representing relations between nodes. Where the subgraph of the ontology includes a node that is not aligned to one of the nodes in the relations graph, a node in the relations graph corresponds to an implicit mention of that subgraph node.

At least one of the identifying of the optimal set of alignments and the instantiating the subgraph as the relations graph may be performed with a processor.

DETAILED DESCRIPTION

Aspects of the exemplary embodiment relate to a system and method for extracting graphs of relations and attributes involving entities from text documents. Graph extraction (GE) is more complex than standard relation extraction (RE), since the output of GE is structured sets of relations potentially containing nodes that do not have explicit mentions in the text, as opposed to the RE task, where the output is a set of individual relations limited to text mentions. The method is unsupervised in the sense that it does not require direct or indirect training examples or hand-crafted extraction rules. It relies on an ontology, i.e., a semantic schema, of the information to extract. In an exemplary embodiment, the method models the extraction of the graph relations jointly by selecting the optimal set of linked relations where multidimensional distances between the relation nodes are minimized.

Figure 1:
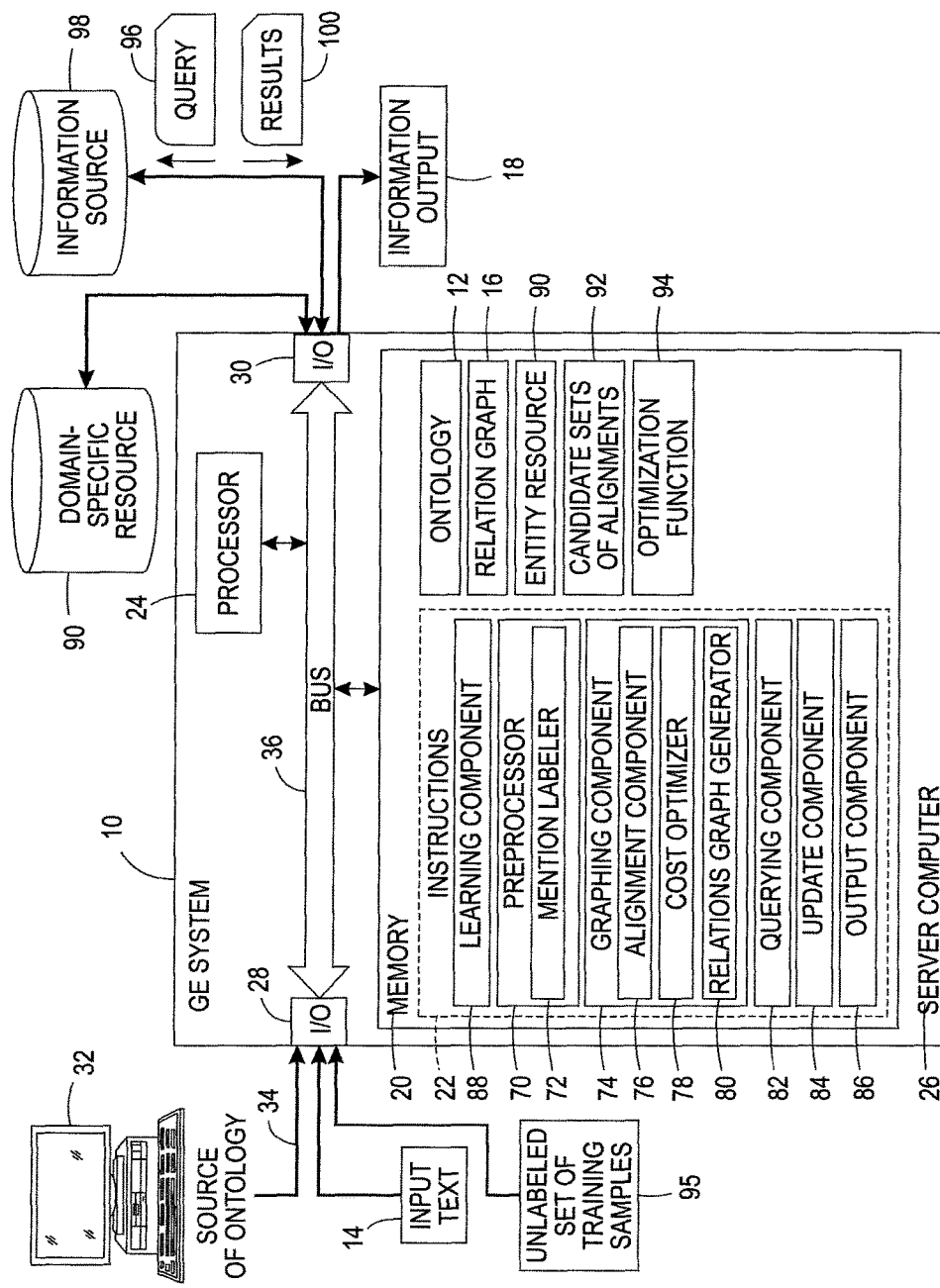
FIG. 1 is a functional block diagram illustrating a graph extraction system in accordance with one aspect of the exemplary embodiment.

FIG. 1 illustrates a computer-implemented system 10 for graph extraction. The system takes as input an ontology 12 of the information to be extracted (as illustrated, for example, in FIG. 2) and input text 14. The input text 14 is in the form of a text sequence (e.g., a sentence, a paragraph or a whole text document), in a natural language, such as English or French. The system outputs a graph 16 (or graphs) of linked relations extracted from the text 14 (and/or other information 18 based thereon). The graph 16 is an instance of the ontology 12, in the sense that it incurs the lowest alignment cost, given a set of constraints.

The exemplary system is an unsupervised system in that it uses unlabeled data for training, i.e., it does not require examples of suitable outputs to be provided along with the raw data. This is in contrast with supervised or semi-supervised systems, which require labeled data, i.e., data for which output examples are provided.

The illustrated system 10 includes memory 20 which stores software instructions 22 for performing the method described below with reference to FIG. 3 and a processor device 24 in communication with the memory 20 which executes the instructions. The system may be hosted by one or more computing devices 26. One or more input/output devices 28, 30 allow the system to communicate with external devices, such as a source 32 of the ontology and/or input text, e.g., via wired or wireless links 34, such as a local area network or a wide area network, such as the Internet. Hardware components 20, 24, 28, 30 of the system 10 may communicate via a data control bus 36.

Figure 2:
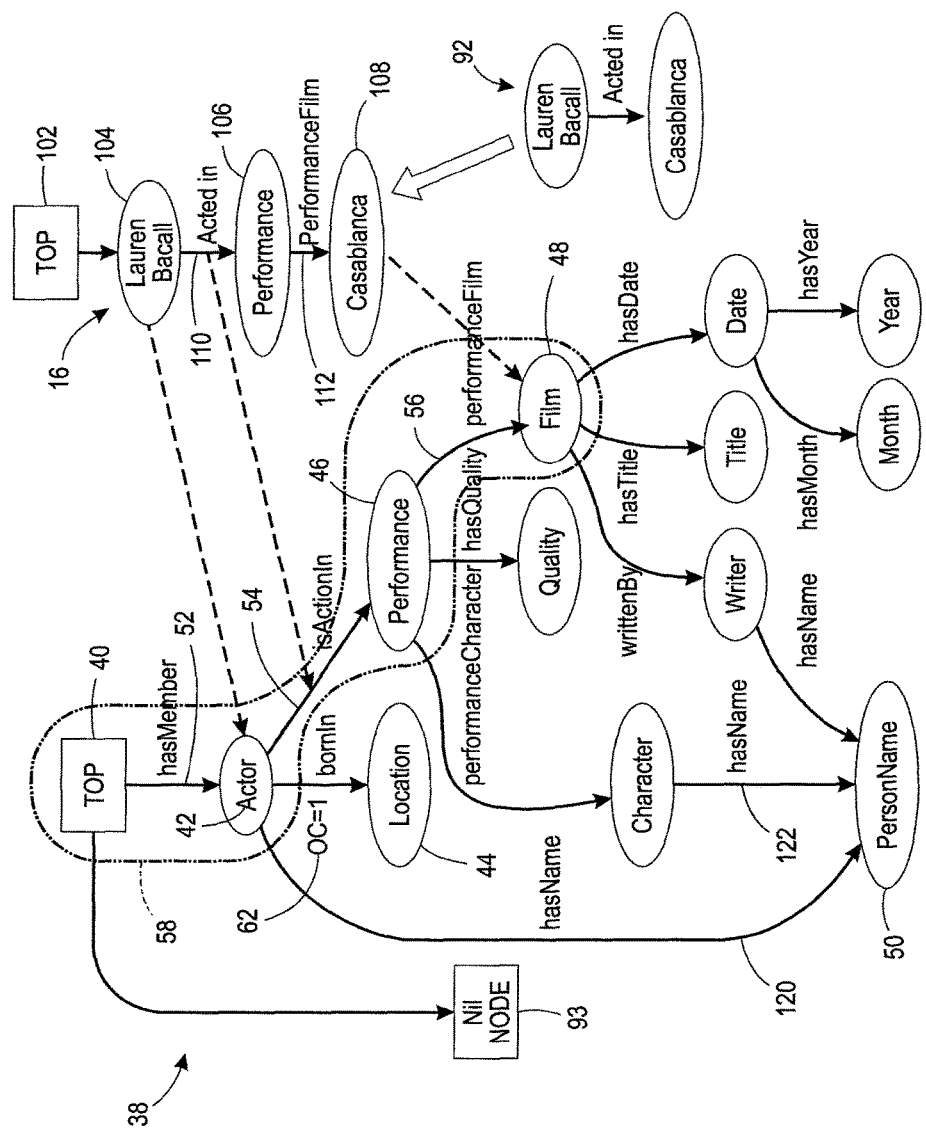
FIG. 2 illustrates an example ontology.

The user-defined ontology 12 is a formal and declarative definition of the information to extract, in the form of classes, class properties, and property ranges. With reference now to FIG. 2, the ontology 12 can be represented as an ontology graph 38, which includes a set of nodes 40, 42, 44, 46, 48, 50, etc., which are connected by edges 52, 54, 56, etc. The nodes of the graph represent classes of entities, such as actor. Some of the entity classes may be more accurately described as concepts, since they are more general than entity classes, but are referred to as entity classes for ease of description. Instances of the entity classes are recognized in the input text. Class properties are represented in the ontology by the edges. An ontology subgraph 58 is a connected set of nodes in the ontology 12. A subgraph 58 can be up to the size of the entire ontology. The top node 40 (or root node) is present in all top subgraphs.

A relations graph 16 extracted from the input text 14 is mapped to a subgraph (at least a part) of the ontology, such as a subgraph 58. For example, for the simple text input, Lauren Bacall acted in Casablanca, Lauren Bacall maps to the Actor class node, and Casablanca to the Performance class node.

Each class in the ontology 12 is associated with a cardinality constraint 62 for each of its properties. The cardinality constraint defines the number of times a property can be instantiated in the graph, without incurring a cost. The cardinality constraint defines a range for the property, with a minimum value and a maximum value. For example, a person's birthdate can only have one value (i.e., its maximum and minimum values are both 1). For a movie actor, the movies acted in could be a minimum of one to a maximum of infinity.

Entities, as used herein, refer to specific entities, such as specific people, places, things in a given world (real or imaginary). The term entity also includes concepts, which refer to more abstract ideas to which specific entities may relate, such as Aspirin and treatment in a medical domain.

The illustrated instructions include a preprocessor 70 which includes a mention labeler 72, a graphing component 74, which includes an alignment component 76, a cost optimizer 78 and a relations graph generator 80, a querying component 82, an update component 84, an output component 86, and a learning component 88.

The mention labeler 72 labels entity mentions (of a specific entity or concept), which are instances, in the text, of relevant entity classes that are in the ontology 12, although these labels may in some cases be ambiguous. The mention labeler 72 may also label instances of properties of the extracted entities. The mention labeler 72 may rely on a domain-specific resource 90 for identifying the entity mentions in the text and syntactic parsing to identify the mentions that are properties of the entity mentions.

The alignment component 76 generates candidate sets of alignments 92 (trees of relations) from the labeled text input 14 that map onto the ontology 16 but which may violate one or more of the constraints 62. The alignment component may identify candidate alignments using a similarity function that provides similarity scores between labels of the ontology classes and properties, and labels of the senses of each of the entity mentions. A threshold score may be established. Where none of the similarity scores for an entity mention meets a threshold, the entity mention may be aligned to an artificial (nil) node 93 in the ontology.

The cost optimizer 78 identifies a candidate set of alignments 92 with minimal cost, using an objective function 94 which takes into account the constraints 62 that are violated and a distance measure computed over the alignments in the set. In one embodiment, the cost optimizer 78 includes a probabilistic model for predicting the optimal one of the sets of alignments 92.

The relations graph generator 80 generates a relations graph 16, based on the identified optimal set of alignments and the corresponding subgraph of the ontology 12.

The learning component 88 learns the parameters of the objective function 94 in a learning stage, using unlabeled training data 95, as described below.

In one embodiment, the querying component 82 generates a query 96 for querying an information source 98, such as a database or knowledge base with a query based on the triples in the extracted graph 16. In another embodiment, the update component 84 updates an information source, such as information source 98, based on some or all of the triples in the graph extracted.

The output component 86 generates information 18 based on the relations graph 16, e.g., the set of triples it contains, or information generated therefrom.

The computer-implemented system 10 may include one or more computing devices 26, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 20 may represent any type of non-transitory computer readable medium such as random access memory (RAM), read only memory (ROM), magnetic disk or tape, optical disk, flash memory, or holographic memory. In one embodiment, the memory 20 comprises a combination of random access memory and read only memory. In some embodiments, the processor 24 and memory 29 may be combined in a single chip. Memory 20 stores processed data and instructions for running the computer as well as the instructions for performing the exemplary method.

The network interface 28, 30 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 24 can be variously embodied, such as by a single-core processor, a dual-core processor (or more generally by a multiple-core processor), a digital processor and cooperating math coprocessor, a digital controller, or the like. The digital processor 24, in addition to executing instructions 22 may also control the operation of the computer 26.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The exemplary system and method for GE are domain-independent and hence can be applied to extract information in various domains and use cases as long as a semantic schema (ontology) 12 of the information to extract and a suitable entity mention labeler 72 for the domain are provided.

Figure 3:
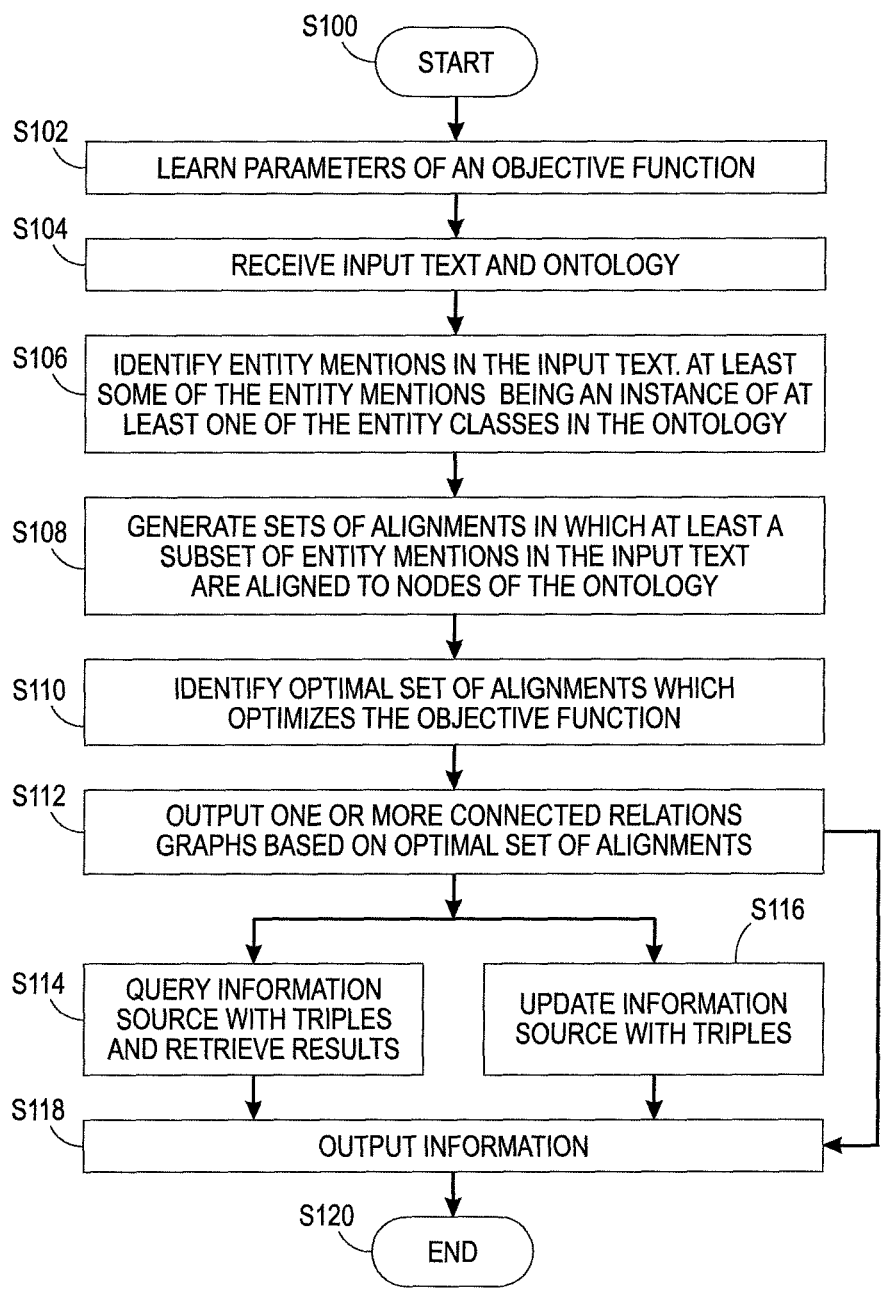
FIG. 3 is a flow chart illustrating a graph extraction method in accordance with another aspect of the exemplary embodiment.

FIG. 3 illustrates the exemplary method of graph extraction, which can be performed with the system of FIG. 1. The method begins at S100.

At S102, parameters of the optimization function 94 may be learned, e.g., by Expectation-Maximization (EM) or other unsupervised learning method, using a set of training sentences 95.

At S104, input text is received 14, and also an ontology 12, if this has not been previously provided. In some embodiments, a user interface is provided to assist a user in creating the ontology.

At S106, relevant entity mentions in the input text are (ambiguously) labeled by the automatic pre-processor 70 with a respective set of one or more senses, each sense corresponding to a respective one of a predefined set of entity classes (e.g., PERSON, LOCATION, TITLE, etc.). Some or all of the entity mentions are each an instance of at least one of the entity classes in the ontology, and in some cases, more than one, corresponding to different senses of the entity mention. The labeling may include matching text strings in the input text to entities in the domain-specific resource 90 and/or pattern matching.

At S108, at least a subset of the entity mentions in the text 14 are aligned to nodes and/or edges of the ontology 12, by the alignment component 76, to generate one or more candidate sets of alignments 92.

At S110, an optimal set (or sets) of the alignments is identified, by the cost optimizer 78. An optimal set of alignments is one that minimizes an objective function 94 which takes into account any constraints that are violated and a multidimensional distance between the nodes participating in the alignments. In particular, one or more subgraphs 58 of the ontology 12 are instantiated based on optimal and consistent sets of these alignments. With such subgraphs, some class nodes may not be aligned with text mentions. However, they are still instantiated and are considered to refer to entities that are not (explicitly) mentioned in the text.

At S112, for every input text sequence 14, one or more connected relations graphs 16 is output, by the relations graph generator 80, each graph including a set of triples, as illustrated in the Examples. Each relations graph 16 corresponds to a respective one of the instantiated subgraphs. The relations graph may thus include one or more relations between two entity mentions in the text that are each an instance of an entity class in the optimal set of alignments and/or one or more relations between an entity mention in the text that is an instance of an entity class in the optimal set of alignments and an implicit mention in the input text that is aligned with an entity class in the subgraph.

At S114, an information source 98 may be queried with a query which is generated from the triples represented in the output relations graph 16 and one or more responsive results 100 retrieved, by the querying component 82.

At S116, an information source 98 may be updated, by the update component 84, based on one or more of the triples represented in the output graph.

At S118, information 18 is output, such as the extracted triples, updated to the information source or results retrieved at S114. The method ends at S120.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 26, (for example, an internal hard drive of RAM), or may be separate (for example, an external hard drive operatively connected with the computer 26), or may be separate and accessed via a digital data network such as a local area network (LAN) or the Internet (for example, as a redundant array of inexpensive or independent disks (RAID) or other network server storage that is indirectly accessed by the computer 26, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further details on the system and method will now be provided.

1. Relations Graph Extraction Examples

An example of an extracted relations graph 16 in line format is illustrated in Example 1 to give a general idea of the nature of the extraction task. In this example, the aim is to extract information about actors and the movies in which they acted. From the input text "Tom Hanks was convincing in Philadelphia (1993), and excellent as Captain John Miller in Saving Private Ryan (1998)." the aim is to extract a graph of relations as illustrated in Example 1. For a better readability, graph triples are represented in a simplified version of the RDF N-Triples format, where most namespaces are omitted in the URIs. N-Triples is a line-based, plain text format for encoding an RDF graph. The second element in each triple is always a property (it can be seen as the relation or attribute type). Strings starting with "e" denote instances of classes, those starting with an upper-case letter denote classes, and those surrounded with quotes are string literals (as opposed to numeric literals).

```
e1 rdf:type Actor
e1 hasName e11
e11 rdf:type PersonName
e11 hasText "Tom Hanks"
e1 isActorIn e2 e1 isActorIn e3
e2 rdf:type Performance
e2 hasQuality e21
e21 rdf:type Quality
e21 hasText "good"
e2 performanceFilm e4
e3 rdf:type Performance
e3 hasQuality e31
e31 rdf:type Quality
e31 hasText "excellent"
e3 performanceFilm e5
e3 performanceCharacter e6
e4 rdf:type Film
e4 hasTitle e41
e41 rdf:type Title
e41 hasText "Philadelphia"
e4 hasDate e7
e5 rdf:type Film
e5 hasTitle e51
e51 rdf:type Title
e51 hasText "Saving Private Ryan"
e5 hasDate e8
e6 rdf:type Character
e6 hasName e61
e61 rdf:type PersonName
e61 hasText "Captain John Miller"
e7 rdf:type Date
e7 hasYear e71
e71 rdf:type Year
e71 hasText "1993"
e8 rdf:type Date
e8 hasYear e81
e81 rdf:type Year
e81 hasText "1998"
```

The relations graph is a formal expression of the following information: there is an actor $e_1$, whose name is "Tom Hanks", and who has (at least) two performances: $e_2$ and $e_3$. His performance $e_2$ was in a film $e_4$ and was good, while his performance $e_3$ was in a film $e_5$, playing a character $e_6$, and was excellent. The title of film $e_4$ is "Philadelphia" and its release date is $e_7$ with year=1993 (day and month of date $e_7$ are unspecified). The title of film $e_5$ is "Saving Private Ryan" and its release date is $e_8$ with year=1998. The name of the character $e_6$ is "Captain John Miller" and it was a person.

This graph can be seen as a single tree, with the root (top node) denoting an actor, hence considered as the main entity among all the entities involved in the relations/attributes. However, the same information could have been expressed differently, for instance by representing the two films as the top entities, in which case the representation would require two trees sharing a local subtree (the same actor entity).

The relations graph in Example 1 contains relations involving class instances (entities) that do not have mentions in the input text: the two performances $e_2$ and $e_3$. These two performance entities are only implicitly referred to in the text: there is not even a verb like "acted" or "played" that could be considered as a mention of a performance.

Another example that illustrates the graph extraction problem is shown in Example 2, where the aim is to extract structured eligibility criteria from clinical trial descriptions. Examples of clinical trial documents, containing eligibility criteria, can be found, for example, at https://clinicaltrials.gov/

---

Exclusion Criteria:

- . . . -No evidence of ventricular ectopics greater than 4/min on EKG
- . . .

Extracted graph:

e1 rdf:type Eligibility_Criteria
e1 isMemberOf Exclusion_Criteria
e1 hasObject e2
e2 rdf:type Laboratory_or_Test_Result
e2 hasPolarity Negative
e2 hasObject e3
e2 hasValue e4
e2 hasProcedure e5
e3 rdf:type Clinical_Attribute
e3 hasTerm "ventricular ectopics"
e4 rdf:type Quantitative_Interval
e4 hasMin e6
e5 rdf:type Diagnostic_Procedure
e5 hasTerm "EKG"
e6 rdf:type Quantitative_Value
e6 hasQuant 4 e6 hasUnit "/min"

---

The relations are explicitly linked, due to the URIs of the class instances (from $e_1$ to $e_6$) that are subjects and/or objects in the triple set.

The set of triples in Example 2 can be interpreted in the following way: there is an eligibility criterion, $e_1$, contained in a set of exclusion criteria, and having as object a laboratory or test result, $e_2$. The laboratory test $e_2$ is negated (polarity=Negative), its object (i.e., the thing that is tested/measured) is $e_3$, "ventricular ectopics" (a clinical attribute), and it is performed with the diagnostic procedure $e_5$, "EKG". The resulting value of the test ($e_4$) is an interval having a minimum, the quantitative value ($e_6$), and no maximum. $e_6$ has a quantity (numerical value 4) and a unit (per minute).

One goal of such extractions could be to obtain a triple representation of the criteria so that they can be transformed into queries in a suitable format for querying the information source, such as SQL or SPARQL queries. Such queries could be used to retrieve a subset of eligible patients from a database or knowledge base of patients. The interpretation of the negative polarity can depend on the use case and on the domain expert knowledge. For this use case (extraction of clinical trials eligibility criteria), the negation covers the conjunction of the three properties of the laboratory test e2, i.e., the statement starting with "No evidence . . . " is true if and only if for any laboratory test, at least one of the three properties (hasObject, hasValue and hasProcedure) is not satisfied.

The exemplary method for graph extraction is unsupervised, in the sense that it does not require direct or indirect examples for training, or hand-crafted extraction rules or patterns. It relies on the user-defined ontology 12 that is a formal and declarative definition of the information to extract, in the form of classes, class properties, and property ranges.

2. The Ontology

An ontology 12, as used herein, is a semantic schema of the relations to extract in a use case, i.e., is a formal intentional definition of the semantic elements (classes and properties) involved in the information to extract. The ontology is also a part of the ontological background knowledge that the author has about the document domain. In that sense, it puts constraints on the document generation process, and determines the set of all possible text expressions and layout structures that the author can use.

Formally an ontology is defined as a structure:

$$O = <C, P, T, O_c>$$

where:

C is a set of classes,

P is a set of properties,

T is a set of triple patterns $<c,p,r>$, where $c \in C$, $p \in P$ and $r \subset C$ (r is the range of property p of class c), and $O_c$ is a set of ontology constraints.

$E^o = C \cup P$ denotes the set of all ontology elements.

A triple pattern can be seen as a conjunction of an rdfs:domain axiom having a single domain class and an rdfs:range axiom with a single class or a union of classes (http://www.w3.org/TR/owl-ref/): the third element of a triple pattern, the property range r, is the set of all possible classes of the values that the class property can take. Therefore, the triple patterns define the set of properties that each class can have and their ranges, and hence the set of relation types that can be extracted from texts for an entity mention of a given class.

Thus, the set of triple patterns T can be seen as statements on what properties can be instantiated for each class in the ontology, and what types of values they can have.

From each triple pattern $<c,p,r>$, a set of triple sub-patterns $\{<c,p,c_r> | c_r \in r\}$ can be generated.

A class c is terminal iff for any $p \in P$ and any $r \subset C$, $<c,p,r> \notin T$. That is, c does not have any properties and therefore instances of c cannot be subjects in a triple.

A class c is a top class iff there is no triple pattern $<c,p,r>$ such that $c \in r$. That is, instances of c cannot be objects or values in a triple. $C^{top} \cup C$ will refer to the set of top classes of an ontology.

The ontology constraints 62, denoted $O_c$, define the cardinalities of class properties: for each class and each of its possible properties, the constraints define the minimal and maximal number of instances the property can have for one instance of the class. More formally, $O_c = \{C_{min}, C_{max}\}$ such that:

$$C_{min}: T \rightarrow \mathbb{N}$$

$$C_{max}: T \rightarrow \mathbb{N} \cup \{-1\}$$

where $\mathbb{N}$ is the set of non-negative integers. By convention, when the maximal cardinality for a property of a class is −1, an instance of that class can have an unlimited number of that property instances.

The graph 38 of the ontology is a directed labeled graph, $G^o$, that represents the ontology. The set of vertices or nodes of $G^o$ is $V(G^o)=C\cup\{o_{top}\}$, where $o_{top}$ is a dummy class node 40 serving as a single entry node (top node) of the ontology graph. The set of edges $E(G^o)$ is defined by the union of the set of all triple sub-patterns generated from the set of triple patterns T, and the set of triple sub-patterns $\{<o_{top},\text{hasMember},c>|\forall_c\in C^{top}\}$, where $C^{top}$ is the set of top classes of the ontology. The edges are labeled with the names of the properties of the triple sub-patterns. An ontology node (such as node 50 in FIG. 2) is terminal iff it represents a terminal class.

An ontology top subgraph 58 in the ontology graph 38 is a connected subgraph of the ontology that contains the top node.

An instance (e.g., graph 16) of a top subgraph $G=<V^o,E^o>$ is a connected graph $g=<V^i,E^i>$ where $V^i$ is a non-empty set of graph nodes 102, 104, 106, 108, etc., called instance nodes and $E^i$ is a non-empty set of graph edges 110, 112, etc., called instance edges. For every $v^i\in V^i$, there is one and only one edge $<v^i,\text{rdf:type},o>\in E^i$ where $o\in V^o$ (i.e., o is a class node of the ontology subgraph 58). $v^i$ is an instance of the ontology class node o. There exists one and only one instance node, $v_{top}^i\in V^i$, that is an instance of the ontology class node $o_{top}$. And $v_{top}^i$ is called the top node of the subgraph instance. Note that node 106 is an implicit node, since it is derived from Performance node 46 in the ontology, but has no corresponding node in the candidate set of alignments 92 from which it is generated.

If an edge $<v_1^i,p,v_2^i>\in E^i$ and $p\neq\text{rdf:type}$, then there exists an edge $<o_1,p,o_2>\in E^o$ such that $v_1^i$ is an instance of $o_1$ and $v_2^i$ is an instance of $o_2$. The edge $<v_1^i,p,v_2^i>$ is thus an instance of the corresponding ontology edge $<o_1,p,o_2>$.

Node parent uniqueness: if $<v_1^i,p,v_2^i>\in E^i$ and $<v_3^i,p,v_2^i>\in E^i$, then $v_1^i=v_3^i$. This forces a subgraph instance 16 to always be a tree, despite the ontology subgraph not necessarily being a tree.

Nodes of the graph g that do not have outgoing edges (such as node 108) are called terminal (instance) nodes.

With this definition, a top ontology subgraph can have multiple distinct instances, depending on the depth of the edge instantiations (starting from the top node), on which ontology edges are instantiated, and on how many instances of an ontology edge exist at a given instance node in the subgraph instance.

2.1 Ontology Example

The relation graph 16 in Example 1 can be considered as an instantiation of a part of an ontology $<C,P,T,O_c>$ where:

C={Actor, Performance, Film, Character, Quality, Date, Year}

P={hasName, isActorin, has Quality, per formanceFilm, performanceCharacter, hasTitle, hasDate, hasYear}

T={<Actor, hasName, PersonName>,
<Actor, bornIn, Location>,
<Actor, isActorin, Performance>,
<Performance, performanceFilm, Film>,
<Performance, performanceCharacter, Character>,
<Performance, has Quality, Quality>,
<Film, hasTitle, Title>,
<Film, hasDate, Date>,
<Film, writtenBy, Writer>,
<Writer, hasName, PersonName>,
<Character, hasName, PersonName>,
<Date, hasYear, Year>,
<Date, hasMonth, Month>}

The instantiation is partial, i.e., only on a subset of the ontology 12, since not all the classes and properties are instantiated.

2.2 Ontology Paths

Let $G=(V^o,E^o)$ be an ontology graph or subgraph and nodes $o_k,o_l\in V^o$.

An ontology path between ontology nodes $o_k$ and $o_l$ is a structure $o_p(p_k,p_l)$, where $o_p$ is a common parent node of $o_k$ and $o_l$, and $p_k$ and $p_l$ are directed sequences of connected nodes and edges from $o_p$ to $o_k$ and $o_l$ respectively, with the constraint that $p_k$ and $p_l$ are distinct, i.e., do not share any nodes, and that such sequences cannot contain multiple occurrences of the same node or edge (this prevents having sequences of infinite length due to cycles in the ontology graph).

There still can be multiple paths between two ontology nodes because an ontology node can be the target of edges coming from different nodes. For example, in FIG. 2, the two nodes 50, 44 for PersonName and Location have a common parent node 42 for Actor. Ontology paths 120, 122 connect node 50 to node 44 via the parent node 42.

Let $\pi_{kl}$ be the set of all possible ontology paths between ontology nodes $o_k$ and $o_l$. Note that by definition, $\pi_{kl}\neq\pi_{lk}$.

All the possible paths $\Pi_o=\{\pi_{kl}^s\}$ in the ontology graph can be enumerated, where $\pi_{kl}^s$ denotes one of the paths from $o_k$ to $o_l$, with $o_k,o_l\in V(G^o)$.

3. Labeling Entity Mentions (S106)

At S106, relevant entity mentions in the input text are (ambiguously) labeled by the automatic pre-processor 70 with a set of senses $S_m$. The entity mentions to be labeled are permitted have alternative labels, each one denoting one possible sense. For example, in Example 1, Philadelphia can be labeled both as a title (sense 1=TITLE), and as a location (sense 2=LOCATION). In Example 2, each sense may include several features, such as a concept unique identifier (CUI), semantic type, and optionally a number of other features, depending on the source(s) of the sense labels.

In contrast to standard RE tasks, it is not assumed that the entity mentions involved in relations are labeled unambiguously in the input: they can be labeled with multiple, alternative semantic class labels corresponding to different senses. A side effect of the relation extraction process is the (possibly partial) disambiguation of the mention senses. The disambiguation of entity types is thus a part of the graph extraction task. This makes GE more difficult than standard RE. It also means that the GE system has weaker preprocessing requirements when compared to a standard RE system.

The preprocessor 70 may include a syntactic parser which includes rules for extracting noun phrases. The mention labeler 72, which may form part of the parser, may access a local or remote domain-specific resource 90 which stores entity mentions and corresponding senses of the entity mentions to identify noun phrases that should be labeled as entity mentions. The resource may be in the form of a list, an ontology or other terminology such as the Unified Medical Language System® (UMLS) or WordNet, or other data structure. In the performance arts domain, lists of known actors, performances (e.g., names of films, plays, and the like), and characters played in performances may be stored. Matching from text strings to entities in lists can be fuzzy, allowing an amount of variation, e.g., typographical, orthographical, or morphological variation. For some entities, such as dates, pattern matching is useful, e.g., using regular expression for recognizing dates. Generic patterns can also be used for recognizing person names, for example, a pattern may specific that a first name that is present in a list of first names be followed by upper case name.

The parser may also extract syntactic relations between entity mentions and other parts of each sentence in the input text 14.

An exemplary parser provides tokenization, morpho-syntactic analysis, POS tagging, chunking and extraction of syntactic dependency relations such as subject, object and modifiers between lexical nodes of a chunk tree. Tokenization involves splitting the text into tokens (generally words), often by looking for white spaces between characters. Morpho-syntactic analysis entails identifying candidate parts of speech (POS) for each word, such as noun, verb, adjective, adverb. Chunking allows words to be grouped around a head to form noun phrases, adjectival phrases, and the like. Extraction of dependency relations (or simply dependencies) involves Extraction of dependency relations (or simply dependencies) may involve extracting SUBJ relations between a noun (or more generally, a noun phrase) and a verb in which the noun phrase serves as a subject of the verb, OBJ relations between a noun phrase that serves as an object of a verb, NOUN-ATTRIBUTE dependencies, and the like.

The parser may provide this functionality by applying a set of rules, called a grammar, dedicated to a particular natural language such as French, English, or Japanese. The grammar is written in a formal rule language, and describes the word or phrase configurations that the parser tries to recognize. The basic rule set used to parse basic documents in French, English, or Japanese is called the "core grammar." Through use of a graphical user interface, a grammarian can create new rules to add to such a core grammar. In some embodiments, the syntactic parser employs a variety of parsing techniques known as robust parsing, as disclosed for example in Salah Aït-Mokhtar, et al., "Robustness beyond shallowness: incremental dependency parsing," in special issue of the NLE Journal (2002); U.S. Pat. No. 7,058,567, incorporated herein by reference; and Caroline Brun, et al., "Normalization and paraphrasing using symbolic methods," ACL: 2nd Int'l Workshop on Paraphrasing, Paraphrase Acquisition and Applications, 2003. In one embodiment, the syntactic parser may be based on the Xerox Incremental Parser (XIP), which may have been enriched with additional processing rules to facilitate the extraction entity mentions. Other natural language processing or parsing algorithms can alternatively be used.

4. Relations Graphs

A (connected) relations graph 16 is represented as a set of connected triples of the form <S,P,O> that represent attributes of, or relations between, entities. S is the subject of the triple and refers to an entity, P is a property that represents an attribute or a relation, and O is the object of the triple, i.e., the value of the attribute or the entity to which the subject of the triple is linked. The sets of entity classes, properties and literals depend on the domain and application where the GE system is used and is defined by the ontology 12.

The output of a GE task is graphs 16 of relations that are semantically consistent with the ontology 12 provided as a parameter of the task. The graphs are in the form of trees where the roots are the main instances (events, situations or entities) involved in the relations. The trees can have any depth. Any non-root node of the tree is a class, an instance or a literal that is the value of a property or attribute of the instance represented by the parent node.

In standard RE, the extracted relations link text mentions, there are explicit links between two relations when they share a common text mention. However, the text mentions encountered here do not always refer to unique instances and thus cannot yield semantically sound graphs when considered as instances. For example, in elliptic structures like "Tom Hanks performed in Philadelphia (1993), and in Saving Private Ryan (1998) as Captain John Miller", the following relations between text mentions can be extracted: ("Tom Hanks", performedIn, "performed"), ("performed", performanceFilm, "Philadelphia"), ("performed", performanceFilm, "Saving Private Ryan"), ("performed", performanceCharacter, "Captain John Miller"). Considering the mention "performed" as a real link between the relations would yield the incorrect semantic interpretation that Tom Hanks acted as Captain John Miller in Philadelphia. The problem here is that a mention does not necessary refer to one class instance.

Therefore, having graphs of relations linking class instances vs. individual relations between text mentions has two main advantages:

1. There is no need for checking the semantic consistency of the extracted relations or to disambiguate them: relations from the same graph are inherently consistent and unambiguous.

2. The graphs provide multiple semantic views of the extracted information: root and intermediary nodes provide global and intermediary views of the instances (events/situations/entities), while the leaves provide the most fine-grained semantic details.

These two advantages make the exploitation of the output by applications easier, e.g., to populate Knowledge bases (KBs) or databases (DBs), or to build KB or DB queries, although entity/record linking may still be useful in the first case.

In the GE task, the extracted relations can involve entities that are not explicitly mentioned in the input text. Being able to extract relations involving class instances without mentions in the text allows for the representation of reification, i.e., events and situations that are considered as class instances on which statements can be made. For example, performing in a specific film is considered as a class instance instead of a relation. This facilitates making statements about it, such as its quality (e.g., bad, average, good, excellent), the character that is being played, if the actor was given an award for this performance (Best Actor awards are usually given to actors for specific performances), etc. In Example 1, if the notion of performing were to be represented as a relation (e.g., named performedIn) instead of a full-citizen class instance (named Performance), it is not possible to state which Tom Hanks' performance was convincing and which was excellent, nor is it possible to express in which movie Hanks acted as Captain John Miller.

This is in contrast to standard RE, where it is not possible to represent the information expressed by the text and by the graph of Example 1 because relations are only between text mentions.

The distance measure of a candidate set of alignments may be defined with three main dimensions: linguistic, ontological, and document structure. Each of these distance dimensions can have multiple components. The components of all the distance dimensions have weights, which are parameters of the GE model.

5. Alignments of Ontology Elements and Text Mentions (S108)

Provided the definition of the ontology in Section 2, the extraction of relations from texts can be seen as the instantiation of subgraphs 58 of the ontology, i.e., the instantiation of subsets of triple patterns by aligning text mentions with some of the nodes of the ontology 16 and creating class instances from all the subgraph nodes.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

5.1 Computing Similarity Between Mention Senses and Ontology Elements

Text mentions can be mapped to ontology elements (classes or properties) due to their (sometimes ambiguous) sense labeling by the pre-processor.

Let S be the set of all possible senses of all mentions in texts, and $E^o$ be the set of all elements (i.e., classes and properties) in the ontology. A similarity function $Sim_{TO}$ that provides a similarity score for any mention sense $s \in S$ and ontology element $o \in E^o$ can be defined:

$$Sim_{TO}: S \times E^o \to [0 \ldots 1]$$

The similarity function can be defined in various ways, such as one or more of:

1. Exact or approximate string matching between mention sense labels and ontology labels.

2. Semantic similarity between mention senses and ontology classes or properties, computed offline from domain ontologies or knowledge bases and lexical and/or semantic resources, e.g., Wordnet.

3. Probabilistic matching based on distributions and co-occurrences of mentions and labels in texts.

4. Similarity scores computed from embeddings of mention labels and ontology labels learned from domain texts.

5.2 Alignments of Ontology Elements with Mention Senses

A text-ontology alignment is a tuple (o,m,s) where o is an ontology element, m is a text mention, s is one of the possible senses of the mention, and $Sim_{TO}(o,s) > 0$. This can be understood as the possibility for the entity, referred to by mention m with sense s, to be of the ontological type o.

Two alignments $(o_1,m_1,s_1)$ and $(o_2,m_2,s_2)$ are considered to be inconsistent iff $m_1=m_2$, and $s_1 \neq s_2$ or $o_1 \neq o_2$. Two alignments are considered to be consistent iff they are not inconsistent.

A consistent set of alignments 92 is a set of alignments A such that for each $a_1, a_2 \in A$, $a_1$ and $a_2$ are consistent.

A complete set of alignments is a consistent set of alignments A such that for any possible alignment $a \notin A$, $A \cup \{a\}$ is not consistent.

5.3 Aligned Instances of Ontology Subgraphs

Given the ontology graph $G=<V^o,E^o>$ and a set of text mentions M labeled with a set of senses S, an aligned instance of a top subgraph of G is a pair (A,g) where:

1. A is the complete set of alignments between the set of mentions M and the ontology elements.

2. $g=<V^i,E^i>$ is an instance of a top subgraph of G.

3. For every alignment $a=<o,m,s> \in A$, there exists one and only one instance element $v^i \in V^i \cup E^i$, such that $v^i$ is an instance of o. The expression $(a,v^i) \in (A,g)$ denotes the assignment of the alignment a to element $v^i$ in the aligned subgraph instance (A,g).

4. For every terminal node $v^i \in V^i$, that is not an instance of $o_{top}$, there exists an alignment $<o,m,s> \in A$ such that $v^i$ is an instance of o (i.e., all terminal nodes in a subgraph instance must be aligned with a text mention, except $v_{top}^i$).

6 Computing Costs for Subgraph Instances (S110)

The overall cost of an aligned subgraph instance is computed as a function of a global distance measure and a global cost of violating the constraints.

6.1. Multidimensional Distances of Aligned Subgraph Instances

In the following, the term "distance" does not necessarily imply that the symmetry and triangle inequality conditions required for the mathematical concept of distance are satisfied.

Let (A,g) be an aligned subgraph instance, and $a_1=(o_1,m_1,s_1)$ and $a_2=(o_2,m_2,s_2)$ be two consistent alignments from A.

A multidimensional distance between two consistent alignments in an aligned subgraph instance is defined as a combination of distance components of at least two dimensions, such as the following three primary dimensions:

a. Linguistic Dimension:

this includes distances involving linguistic and textual objects from the input text, i.e., characters, tokens, words, mentions, concepts, syntactic and semantic structures. The values of some of the distances here can be exogenous to the input text being processed (e.g., semantic dissimilarities computed over word or concept embeddings that are learned offline).

b. Ontological Dimension:

this includes distances involving ontology elements (classes and properties). The length of a path between two ontological elements is an example of such a distance. Again, the values of some of the distances here can be external to the ontology: e.g., semantic dissimilarity of two ontology class labels, computed from an external semantic resource such as Wordnet, or from concept embeddings learned offline from concept occurrences in texts.

c. Document Structure Dimension:

this includes distances between nodes in the document structure. The document structure is the tree structure that represents the structural elements of a document (such as headers, sections, subsections, tables, table rows, table cells, lists, list items, etc.), which may be defined in the Document Object Model (DOM) for structured documents, such as XML, HTML and XHTML documents. A distance between two nodes in such a document structure can be defined, for example, as the number of nodes that exist in the path that relates the two nodes in the tree structure.

While three dimensions are exemplified it is to be appreciated that fewer or more than three dimensions may be employed, such as one, two, four, or more dimensions. Further, distance components that are hybrid can also be defined, e.g., by combining the primary dimensions: the two linguistic-ontological distances (LO distances) defined as $Sim_{TO}(o_1,s_1)$ and $Sim_{TO}(o_2,s_2)$.

Let n be the number of distance components. The ith distance component between $a_1$ and $a_2$ within (A,g) is written $d_i(a_1,a_2,g)$ and satisfies: $0 \leq d_i(a_1,a_2,g) \leq 1$.

The global distance of an aligned subgraph instance (A,g) is a combination of the distance components within g between all pairs $(a_1,a_2) \in A^2$:

$$D(A, g) = \bigoplus_{a_1, a_2 \in A, 1 \leq i \leq n} d_i(a_1, a_2, g) \quad (1)$$

The combination $\bigoplus_{a_1, a_2 \in A, 1 \leq i \leq n}$ can be implemented in various ways. For example, it can be a linear combination, e.g. a normalized weighted sum of all the distance components of the alignment pairs.

6.2. Cardinality Constraint Costs

The property cardinality constraints 62 ($C_{min}$ and $C_{max}$) put limits on the number of property instances an instance of an ontology class can have. These constraints are based domain knowledge, and are entirely independent from the distributions of class and property instances in texts. For example, if the ontology contains a class Person, then any instance of a Person has one and only one bornOn property (date of birth) and one and only one bornIn property (place of birth). This does not guarantee that if a Person instance is mentioned in a text, then the date or place of birth of the person will be mentioned, nor does it guarantee that if it is mentioned, it will be mentioned at most once.

The aim is to favor subgraph instantiations that maximize the satisfaction of these constraints by their instance nodes. It may be assumed that the probability of a class instantiation being correct increases when the minimal number of the instance properties are jointly found, without exceeding their maximal number.

Let $v^i$ be an instance node in a subgraph instance. Let $T_{v^i}$ be the set of all triple patterns of the ontology that have as a domain class (first element of the triple pattern) the ontology node o, such that $v^i$ is an instance of o. Let t be any triple pattern $<o,p,c_r> \in T_{v^i}$.

Let $\gamma_{v^i,t}^{min}$ be a cost value for a node $v^i$ in a subgraph instance 16, measuring the violation of the minimal cardinality constraint $C_{min}$ of an ontology triple pattern $t \in T_{v^i}$. If the number of outgoing edges of $v^i$ with property p is greater or equal to Cmin(t), then node $v^i$ satisfies the minimal cardinality constraint and hence $\gamma_{v^i,t}^{min}=0$. Similarly, $\gamma_{v^i,t}^{max}$ is the maximal cardinality constraint. If the number of outgoing edges of $v^i$ with property p is less than or equal to Cmax(t), then node $v^i$ satisfies the maximal cardinality constraint and hence $\gamma_{v^i,t}^{max}=0$. If one or more of the constraints is not met, then the respective cost of this constraint is non-zero.

The cardinality cost $\gamma_{v^i}$ of a single node $v^i$ in a subgraph instance is defined as a function of the minimal and maximal constraint costs, e.g., as:

$$\gamma_{v^i} = \Sigma_{t \in T_{v^i}} \gamma_{v^i,t}^{min} + \gamma_{v^i,t}^{max}$$

Then the total cost of the cardinality constraints over all nodes in a subgraph instance $g=(V^i,E^i)$ is defined as a combination of the cardinality costs of its nodes:

$$\Gamma(g) = \otimes_{v^i \in V^i} \gamma_{v^i} \qquad (2)$$

The combination $\otimes_{v^i \in V^i}$ can be implemented in various ways, e.g., as an averaged sum or product of the cost of each node.

7. Graph Extraction Solution (S112)

Given the ontology graph $G=<V^o,E^o>$ and a set of input text mentions M labelled with a set of senses S, then it is possible for there to be multiple distinct subgraph instances, given the definition above, and hence multiple aligned subgraph instances.

Let $\Psi$ be the set of all possible aligned subgraph instances $(A_p,g_p)$.

The graph extraction solution is the optimal aligned subgraph instance, defined as the aligned subgraph instance that minimizes an objective function that is a combination of the multidimensional distance D and the cardinality constraints $\Gamma(g_p)$:

$$(A^*,g^*) = \mathrm{argmin}_{(A_p,g_p) \in \Psi} D(A_p,g_p) \odot \Gamma(g_p) \qquad (3)$$

The combination $\odot$ can be implemented in various ways, e.g. as a sum (optionally weighted) or a product.

8. Example Implementation: Probabilistic Graph Edges Alignment

The exemplary method for identifying an optimal alignment described above in section 7 can be implemented in practice in various ways, depending on how the combination functions $\otimes$, $\oplus$, and $\odot$ in Equations (1), (2), and (3) are implemented; the exact set of multidimensional distance components being used in the global distance computation; and how the similarity function $Sim_{TO}$, which provides a similarity score between mention senses and ontology nodes, is implemented.

In one embodiment, a probabilistic embodiment of the general method described above may be employed.

In this embodiment, a dual objective function is formulated that aims to maximize the probability of producing a specific aligned subgraph instance.

$$(A^*,g^*) = \arg\max_{(A_p,g_p) \in \Psi} P(A,g \mid M, G^o) P_C(g) = \qquad (4)$$
$$\arg\max_{A,g} \log P(A,g \mid M, G^o) + \log P_C(g)$$

$P(A,g|M,G^o)$ (complementary to $D(A,g)$) corresponds to the probability of generating an aligned subgraph instance A,g given the input set of mentions M and ontology graph $G^o$.

$P_C(g)$ (complementary to $\Gamma(g_p)$) corresponds to the probability that the ontology cardinality constraints are valid in the subgraph instance g. Note, that this means that combination function $\odot$ corresponds to the +-operator (in the case of a log-linear formulation of the model).

The ontological distance measure is separated from the distances specific to the input text (linguistic and document structure). In what follows an original input sentence is represented as a graph of mentions ($G^M$), where edges connecting a pair of mentions combine different "input-specific" distances. Therefore the mutual distance minimization criteria can be reformulated as maximum common edge subgraph (or subgraph edge matching) criteria with the following underlying hypothesis: Each two mentions that closely connected in the input text should match to the closely connected ontology nodes.

In what follows, the representations which can be used for the input objects $G^M$ and $G^O$ are first specified, more specifically highlighting the difference with the representations that have already been defined previously in the general outline of the approach. Second, definitions of $P_C(g)$ and $P(A,g|M,G^o)$ are provided. Finally, an explanation of how to search for an optimal solution is provided.

8.1 Representation of Input Objects: Set of Mentions and Ontology Graph

8.1.1 Mentions Graph

As noted above, the input text is used to generate a set of mentions M, with a set of senses assigned to each mention. The aim is to integrate the related multidimensional distances into the input representation. The original text can be represented as a directed graph $G^M$ with labeled edges, where the set of vertices is defined by the mentions identified by the pre-processor $V(G^M)=M=\{m_1, \ldots, m_N\}$, and the set of edges is defined by all the possible edges connecting pairs of mentions $E(G^M)=\{e^{m_{i,j}}\}_{i,j=1 \ldots N, i \neq j}$. In what follows, $e^{m_{i,j}}$ represents an annotation for an edge connecting mention $m_i$ to the mention $m_j$).

A pair of mentions can be connected by different types of edges that correspond to different distance dimensions. The label of each individual edge is defined by the dimension it comes from (e.g., label of syntactic dependency, document structure hierarchical path). Multiple (alternative) labels may also be considered for the same dimension. Each label $l_s$ is associated with a specific weight $w_s$. The value of the weight $w_s$ can be directly defined by the corresponding dimension s of the multidimensional distance defined above. The weight $w_s$ should reflect the notion of proximity, and therefore it should be inversely proportional to the distance. In the end, each edge $e^{m_{i,j}}$ of the mentions graph is associated with one vector of labels $l_{m_{i,j}}$ (multi-label) containing pairs $l_s, w_s$ for each dimension considered for a pair of mentions $m_i, m_j \in V(G^M)$.

In order to guarantee that the graph $G^M$ is connected a dummy top node $m_{top}$ is added.

8.1.2 Ontology Paths

The notion of the ontology paths defined above is reused but here to the set of top-down directed paths (from parent to child) only. Therefore, each ontology path can be represented as a triple of source node $o_k$, destination node $o_l$, and the label of the path $p_{kl}^i$ connecting $o_k$ and $o_l$. For example, if the path $\pi_{kl}^i$ connecting $o_k$ to $o_l$ contains only one ontology edge with the label (property) hasObject, then the $p_{kl}^i$=hasObject. This label on the other hand can appear in different paths, connecting different nodes of ontology graph. If the ontology path $\pi_{kl}^i$ contains several ontology edges, the label $p_{kl}^i$ would integrate the intermediate ontology node labels that appear in the path (e.g., hasObject Performance hasActor). The original ontology path $\pi_{kl}^i$ can always be reconstructed unambiguously from the triple $(o_k, p_{kl}^i, o_l)$.

In practice, depending on the size of the ontology, it may be advantageous to restrict the length of the paths being considered to a certain path length. This restriction is also consistent with the assumption that closely connected mentions should be aligned to close ontology nodes. In the experiments below, the length of the paths is restricted to a maximum of 3 edges.

8.2 Definition of Cost of Cardinality Constraints

In this section a definition of the dual function of cost of cardinality constraints $P_C(g)$ is provided As noted above, a subgraph instance g is valid according to the ontology cardinality constraints if it is valid according the constraints on each triple pattern t, and therefore $P_C(g)$ can be rewritten as:

$$P_C(g) = \Pi_{t \in E(G^o)} p_{t_{min}}(g) * p_{t_{max}}(g)$$

with, $p_{t_{min}}(g)$ and $p_{t_{max}}(g)$ being the probabilities that g is valid according to the minimal/maximal cardinality constraints on t.

The statement $g=(V^i, E^i)$ respects the constraint on $t=(o, p, r)$ implies that for each instance node $v_i \in V^i$ (instance of o), the cardinality of t with respect to $v_i$ in g should be within the range$[C_{min}(t), C_{max}(t)]$.

The cardinality of triple pattern t with respect to $v_i$ can be computed as a number of the triple instances $e^i \in E^i$ such that $e^i$ has $v_i$ as a subject, and property p.

$$\text{Card}_g(t, v_i) = \Sigma_{e^i \in E^i} 1(e^i = (v_i, p, v_k), v_k \in r) \quad (5)$$

With such a definition of constraints, Equations (6) and (7) define how to compute the constraint parameters.

$$p_{t_{min}}(g) = \prod_{v_i \in V^i | v_i \text{ isinstanceofo}} \begin{cases} 1 & \text{if } I(\text{Card}_g(t, v_i) \geq C_{min}(t)) \\ \varepsilon_{t_{min}} & \text{otherwise} \end{cases} \quad (6)$$

$$= \prod_{v_i \in V^i | v_i \text{ isinstanceofo}} \max(\varepsilon_{t_{min}}, I(\text{Card}_g(t, v_i) \geq C_{min}(t)))$$

$$p_{t_{max}}(g) = \prod_{v_i \in V^i | v_i \text{ isinstanceofo}} \max(\varepsilon_{t_{max}}, I(\text{Card}_g(t, v_i) \leq C_{max}(t))) \quad (7)$$

$\varepsilon_{t_{min}}$ and $\varepsilon_{t_{max}}$ are set to an arbitrary small value, depending on how strong the constraints for triple t should be. In the case of hard constraints, these values can be set to 0, which means that the final score for the whole aligned subgraph instance (Equation (4)) would be equal to $-\infty$. I represents the indicator function.

Note, that in this case the value of cost $\gamma_{v_i, t}^{min}$ will correspond to 0=log 1, when no constraints are violated, or to $-\log \varepsilon_t^{min}$, if the constraint is violated (the same is valid for maximum cardinality constraints). The operation function ⊗ would correspond to the +-operator.

8.3 Reformulation of the Multidimensional Distance Function

First, since an input as graph of mentions has been defined, $P(A,g|M,G^o)=P(A,g|G^M,G^o)$. $P(A,g|G^M,G^o)$ should correspond to the probabilistic formulation of the maximum common edge subgraph matching problem. This can be justified as follows:

In principle, the alignment A that maps nodes of $G^M$ to the nodes of $G^o$ corresponds to the inexact subgraph matching. However, it is not sufficient to find an optimal subgraph matching in order to reconstruct unambiguously the subgraph instance g. This is because there may exist several ontology paths $\pi_{kl}^i$ connecting a pair of ontology nodes $o_k$ and $o_l$. Moreover, the method should allow for the case when a subgraph instance g contains abstract ontology nodes instances (that do not match explicitly any mention $m \in V(G^M)$).

Therefore, the path $\pi_{kl}^i$ should be chosen at the same time as a pair of nodes $o_k, o_l$ is matched to a pair of mentions $m_i, m_j$. Intermediate nodes (not matched explicitly to any mention in the text) contained on the path $\pi_{kl}^i$ would each generate an abstract ontology node instance.

The original set of edges $E(G^o)$ of the ontology graph $G^o$ can be extended with the set of all the possible ontology paths $\Pi_o$ as defined in section 1b. Now, the problem can be formulated as a maximum common edge subgraph between the original mentions graph $G^M$ and an extended ontology graph.

The next constraint is that the final subgraph instance g should be from a tree. This implies that the subset of edges from $E(G^M)$ that are aligned to the ontology paths should form a tree. The constraints on vertex matching A defined above imply that for each vertex $m_i \in (V(G_m))$ there should exist exactly one corresponding ontology node $o \in V(G^o)$. (In practice, however, some mentions may not fit to the user defined ontology. In order to deal with such cases, NIL nodes may be included in the ontology). Therefore, the set of edges from $E(G^M)$ should form a spanning tree of $G^M$, as well as the set of paths from extended ontology graph $G^o$. Let $st(G^M)$ be an individual spanning tree and $ST(G^M)$ be a set of all the possible spanning trees. Each edge $e_m \in st(G^M)$ instantiates a new ontology path instance (which corresponds to the set of triple instances). The union of the triple instances instantiated by $E(st(G^M))$ then forms the final ontology subtree instance g.

8.3.1 Model Decomposition $P(A,g|G^M,G^o)$ needs to be decomposed into a set of components that can be estimated.

Since the final aligned subgraph instance should form a tree, this allows the set of alignments to be viewed as a set of random variables organized in Bayesian network forming a tree. Thus, it may be assumed that a variable corresponding to each individual vertex alignment $a_i$ depends on it's parent alignment $a_j$ and on ontology path label $p_{k_jk_i}{}^s$ that has been chosen to attach it to the previous alignment.

Let N denote the number of vertices in $G^M$ ($N=|V(G^M)|$), and pa(i) denote the index of the parent of the alignment $a_i$. $a_{top}$ corresponds to the initial top nodes alignment (it aligns the dummy top nodes introduced in the ontology graph and mentions graph). Thus, following decomposition can be performed:

$$p(A,g|G^o,G^M)=p(a_{top})\Pi_{i=1}^{N}p(a_i,p_{ij}{}^s,l_{m_{ij}}|a_{pa(i)}) \quad (8)$$

Since $p(a_{top})$ will be the same for any valid set of alignments, it does not have any impact on the optimal solution and can be ignored in the final objective function.

In what follows, pa(i) is denoted by j. As previously noted, an individual vertex alignment is a tuple (o,m,s).

It can be assumed that mention sense variable s depends on the observed mention m, and that the ontology node variable o depends on the sense variable s. It can also be assumed that the path label $p_{ij}{}^s$ depends on the parent node $o_j$, and defines target node $o_i$. The path label $p_{ij}{}^s$ also depends on the edge connecting mentions $m_i$ and $m_j$, defined by its multi-label $l_{m_{ij}}$. Eqn. (9) gives the final decomposition for edge alignment that can be obtained using the variable dependence assumptions defined above.

$$p(a_i,p_{ij}{}^s,l_{m_{ij}}|a_j)=p(m_i|s_i)p(s_i|o_i)p(o_i,p_{ij}{}^s|o_j)p(l_{m_{ij}}|p_{ij}{}^s) \quad (9)$$

The full decomposition proof for Eqn. (9) is shown in Section 9 below.

Combining Eqns (4), (8) and (9) gives the final objective function shown in Eqn. (10):

$$(A^*, g^*) = \arg\max_{A,g} \sum_{i=1}^{N} \log p(m_i | s_i^j) + \quad (10)$$

$$\log p(s_i^j | o_{k_i}) + \sum_{a_{i,j} \in a_e} \log p(l_{m_{ij}} | p_{k_ik_j}^s) +$$

$$\log P(o_{k_i}, p_{k_ik_j}^s | o_{k_j}) + \sum_{t \in T} \log p_{t_{min}}(g) + \log p_{t_{max}}(g)$$

8.4 Search for Maximum Common Edge Subtree

A top-down generation of the aligned sub-tree instance (A,g) can be performed using beam search procedure. All the hypotheses are organized into stacks, with one stack per number of mentions covered by current hypothesis. A first stack contains an empty hypothesis. Overall there are N+1 stacks for an input text containing N mentions, where the last stack contains the complete hypothesis ordered by their scores.

Starting from initial (empty) hypothesis that contains one alignment between the dummy top nodes of the mentions graph $G^M$ and ontology graph $G^o$, at inference step n a new alignment $a''=(o_{k_j}, m_{j''}, s_j{}^{j''})$ is chosen to add to the graph, and all the possible ontology paths $\pi_{k_jk_j}{}^i \in \Pi^o$, s.t. $\exists v \in g$ such that v is an instance of $o_{k'}$ are evaluated. It is possible to assign a score to each hypothesis as a value of the objective function (Eqn. 4). All the possible hypotheses are placed in the stack number n+1, and ordered by their score. Histogram pruning and threshold pruning may be performed at the end of each step. Histogram pruning keeps only a certain number of best scored hypothesis in each stack; threshold pruning keeps only the hypothesis with the scores that do not exceed a certain ratio compared to the best-scored hypothesis in the current stack.

When the procedure is over the list of the best-scored hypothesis is obtained from the last stack.

8.5 Parameters of the Model

The exemplary model is defined by Eqn. (10), thus the following parameters need to be defined:

1. vertex alignment parameters defined in the first line of the equation, containing two components:
   a) p(m|s), referred to herein as mention sense disambiguation parameters; and
   b) p(s|o), referred to herein as sense to node alignment parameters;
2. $p(l_m|p)$, referred to as edge label alignment parameters; and
3. ontology node transition parameters $p(o_k,p_{kl}{}^s|o_l)$.

In what follows, a method for estimate each of the parameter values from data is provided.

8.5.1 Vertices Alignment Parameters

Mention sense disambiguation: p(m|s)=d(m|s) can be given by the pre-annotator directly or can be estimated from the large corpus of pre-annotated data.

Sense to node alignment: $p(s|o)=m_v(s|o)$ can be computed using the similarity function $Sim_{TO}$ defined above:

$$m_V(s | o) = \frac{Sim_{TO}(s, o)}{\sum_{s'} Sim_{TO}(s', o)}.$$

As mentioned previously, an artificial NIL node 93 is added to the ontology in order to deal with the alignments of the mentions that do not fit in the conceptual schema defined by the user. Therefore, the sense to node alignment parameters for NIL nodes need to be defined at the same time as all the other nodes. This can be done by initializing $m_v(s|o=NIL):p(s)$, where p(s) is the distribution of the mention sense, and can be estimated directly from data. These parameters can further be optimized using an Expectation-Maximization procedure, as described in section 8.5.2.

8.5.2 Edge Labels Alignment Parameters

The observations of multi-labels $l_m$ can be very sparse since they refer to any possible vector of labels with an individual weight for each label which may vary from one example to another. Therefore it is advantageous to decompose these parameters into less sparse components. It can be assumed that each of the dimensions $l_u$ of the vector l are independent and mutually exclusive (This is a simplification assumption which is not totally correct. This would be the case however if only syntactic dependencies were considered, and different dimensions of l would have been alternative syntactic paths). Thus, any label $l_u$ from the vector $l_m$ can potentially align to the ontology path label $p^s$, independently on all the other labels present in $l_m$.

Therefore we can decompose the edge labels alignment parameters can be decompose as:

$$p(l_m|p)=\Sigma_u p(l_u|p)*w_u$$

where:
$w_u$ refers to the weight of the dimension $l_u$ in the vector $l_m$, and may be specific to the observed data.
$m_E(l_u|p)=p(l_u|p)$ refers to label mapping parameters; these parameters can be initialized as having equal probability; they will further be optimized with EM, as described below.

8.5.3 Ontology Node Transition Parameters

These parameters can first be initialized from the ontology graph 38. The triple $(o_k,p^s,o_l)$ defines unambiguously a corresponding path $\pi_{kl}^s$ in ontology graph $G^o$ from the node $o_k$ to the node $o_l$. Each path $\pi_{kl}^s$ can be seen as a sequence of directed edges each $e_1 \ldots e_k$, each $e_i \in E(G^o)$, where source node of $e_i$ corresponds to the destination node of $e_{i-1}$: $s(e_i)=d(e_{i-1})$. Therefore, following decomposition is possible:

$$p(o_k, p_{kl}^s \mid o_l) = \prod_{e^o \in \pi_{kl}^s} p(e^o \mid s(e^o))$$

Thus, the parameters to estimate are the individual ontology graph edges transition $p(e^o|s(e^o))=t(e^o|s(e^o))$. These parameters are first initialized from the ontology graph taking the following constraints into account for each non leaf vertex $s \in V(G^o)$: $\Sigma_{e^o|s(e^o)=s}\, t(e^o|s)=1$. A non-leaf vertex has outgoing edges.

These parameters can be initialized uniformly:

$$t(e^o \mid s) = \frac{1}{|\{e' \mid s(e') = s\}|}.$$

They can further be optimized as defined in the section 8.6.

8.6 EM for Parameters Optimization

In this embodiment, the training data is incomplete, meaning that no corresponding alignments are available in the training data. The Expectation Maximization algorithm is performed for learning the parameters of the optimization function.

An exemplary EM algorithm is given by Algorithm 1.

---

Algorithm 1: Expectation-Maximization for parameters optimization

Require: Training samples $x^{(1)} \ldots x^{(n)}$; for each each $x^{(i)}$ assign $G_{(i)}^M$
Initialize $m_E^0(l_u|p)$, $t^0(e|o)$
for all t = 1 ... T do
  for all i = 1 ... n do
    Generate N-best list of optimal subtree instances
    $\{(A, g)^1, \ldots, (A, g)^N\}$
    for all k = 1 ... N do $$\delta((A, g)^k \mid x^{(i)}) = \frac{p(A^k, g^k \mid G_{(i)}^M, G^o)}{\sum_{(A,g) \in N\text{-}bestlist} p(A, g \mid G_{(i)}^M, G^o)} \quad (11)$$

Update expected counts:
    for all $o \in V(g^k)$ do
      count(o) $\leftarrow$ count(o) + $\delta((A, g)^k|x^{(i)})$
    end for
    for all $e \in E(g^k)$ do
      count(e) $\leftarrow$ count(e) + $\delta((A, g)^k|x^{(i)})$
    end for
    for all pairs of aligned labels $l_u$, p do
      count($l_u$, p) $\leftarrow$ count($l_u$, p) + $\delta((A, g)^k|x^{(i)})$
      count(p) $\leftarrow$ count(p) + $\delta((A, g)^k|x^{(i)})$
    end for
  end for
end for
Update model parameters:

$$m_E^t(l_u \mid p) = \frac{\text{count}(l_u, p)}{\text{count}(p)} \quad (12)$$

$$t^t(e \mid s(e)) = \frac{\text{count}(e)}{\text{count}(s(e))} \quad (13)$$

end for

---

Algorithm 1 make take, as input training data 95, a set of input sentences $x=\{x^{(1)} \ldots x^{(n)}\}$, where each training sample $x^{(i)}$ defines a mentions graph $G_{(i)}^M$.

First, all the parameters of the model $\theta^0=(m_E(s|o), d(m|s), m_E(l_u|p), t(e|s))$ are initialized, as defined previously. At the beginning, the EM may concentrate on the parameters for which no prior information is available, such as label mapping parameters $m_E(l_u|p)$ and ontology transition parameters $t(e|s)$.

The expected counts for the parameters to be optimized using inference (as defined in the section 8.4) need to be computed. These expected counts are then used in order to update model parameters $\theta$.

At each iteration t, the parameters $\theta_{t-1}$ from the previous iterations are used in order to find the set of possible ontology subtree instances $\{(A,g)\}_{(i)}$ for each input mentions graph $G_{(i)}^M$. In practice, it is computationally expensive to enumerate all the consistent alignments. Therefore, the method may be restricted to an N-best list of possible alignments structures, where each $(A,g)$ in this list is assigned a probability $p(A,g|G_{(i)}^M,G^o;\theta_{t-1})$.

At each iteration t, for each training sample $x^{(i)}$, and for each potential subtree instance $(A,g)$ the algorithm computes an update factor $\delta(A,g|x^{(i)})$, which is a function of the probability p and the probabilities of other training samples in the N-best list:

$$\delta(A, g \mid x^{(i)}) = \frac{p(A, g \mid G_{(i)}^M, G^o; \theta_{t-1})}{\sum_{(A',g') \in N\text{-}bestlist} p(A', g' \mid G_{(i)}^M, G^o; \theta_{t-1})}$$

Next, the expected counts for joint labels co-occurrence, ontology triple occurrence and ontology node occurrence may be updated, as follows:

For each ontology node from g: count(o)$\leftarrow$count(o)+$\delta(A, g|x^{(i)})$, i.e., the expected count for the ontology node is updated as a function of the previous expected count and the update factor.

For each ontology edge e present in the ontology subgraph corresponding to the subgraph instance g: count(e)$\leftarrow$count(e)+$\delta(A,g|x^{(i)})$, i.e., the expected count for the ontology edge is updated as a function of the previous expected count and the update factor.

For each pair of labels $l_u$,p that co-occur in the obtained subgraph edge matching: count($l_u$,p)$\leftarrow$count($l_u$,p)+$\delta(A,g|x^{(i)})$; count(p)$\leftarrow$count(p)+$\delta(A,g|x^{(i)})$ Finally, the thus computed expected counts can be used to update parameters of the model (which will correspond to new $\theta_t$):

$$m_E(l_u \mid p) = \frac{\text{count}(l_u, p)}{\text{count}(p)}$$

$$t(e \mid s(e)) = \frac{\text{count}(e)}{\text{count}(s(e))}$$

9. Proof for Edge Alignment Decomposition (Eqn. 9)

Figure 4:
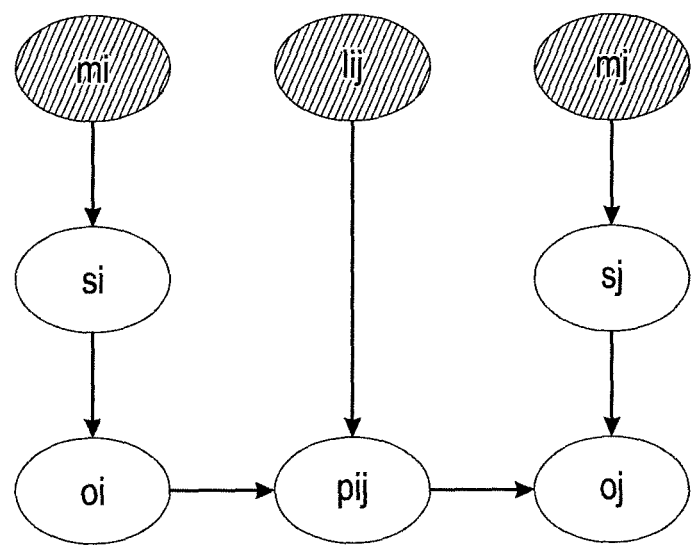
FIG. 4 shows a schema which illustrates dependencies between variables.

The schema in FIG. 4 illustrates the dependencies between variables.

$$p(a_i, p_{ij}^s \mid a_j) = p(a_i \mid p_{ij}^s)p(p_{ij}^s \mid a_i, I_{m_{ij}})p(I_{m_{ij}}) \quad (14)$$

$$= p(a_i \mid p_{ij}^s)\frac{p(a_j, I_{m_{ij}} \mid p_{ij}^s)p(p_{ij}^s)}{p(a_j, I_{m_{ij}})} p(I_{m_{ij}})$$

-continued $$= p(a_i \mid p_{ij}^s) \frac{p(a_j \mid p_{ij}^s)p(l_{m_{ij}} \mid p_{ij}^s)p(p_{ij}^s)}{p(a_j)}$$

$$= p(a_i \mid p_{ij}^s)p(p_{ij}^s \mid a_j)p(l_{m_{ij}} \mid p_{ij}^s)$$

a=(o,m,s), where s depends on m and o depends on s. Therefore following decomposition is possible.

$$p(a_i \mid p_{ij}^s)p(p_{ij}^s \mid a_j) = p(m_i, s_i, o_i \mid p_{ij}^s)p(p_{ij}^s \mid m_j, s_j, o_j) \quad (15)$$

$$= p(o_i \mid p_{ij}^s, m_i, s_i)p(m_i, s_i)p(p_{ij}^s \mid o_j)$$

$$= \frac{p(m_i, s_i \mid o_i)p(p_{ij}^s \mid o_i)p(o_i)p(m_i, s_i)}{p(m_i, s_i)p(p_{ij}^s)} p(p_{ij}^s \mid o_j)$$

$$= p(m_i \mid s_i)p(s_i \mid o_i)p(o_i \mid p_{ij}^s)p(p_{ij}^s \mid o_j)$$

$$= p(m_i \mid s_i)p(s_i \mid o_i)p(o_i, p_{ij}^s \mid o_j)$$

The combination of Eqns (14) and (15) gives the final decomposition:

$$p(a_i, p_{ij}^s \mid a_j) = p(m_i \mid s_i)p(s_i \mid o_i)p(o_i, p_{ij}^s \mid o_j)p(l_{m_{ij}} \mid p_{ij}^s) \quad (16)$$

The exemplary system and method find application in information extraction from text in a variety of different contexts. The method can be easily adapted to a new use case by allowing an expert user to specify the information he or she wishes to extract via semantic schema 12. A model for information extraction can then be optimized from a large set of non-annotated documents. The method may integrate interactive feedback that will allow the user to improve the initial model. While annotated training examples may be needed for training the preprocessor, creating annotations in order to train a preprocessing model is an easier task than creating annotations for a graph of relations. However, as long as the extraction task is defined within the same domain (e.g., medical) the same preprocessor can be adapted for different use cases with appropriate terminologies. The adaptation of the main GE task is achieved through semantic schema adaptation.

The system and method do not require any learning examples of relations, since the method is unsupervised.

Without intending to limit the scope of the exemplary embodiment, the following Example demonstrates the applicability of the method.

EXAMPLE

A small evaluation was performed for a Clinical Trials Eligibility Criteria (CTEC) use case. Example 2 above illustrates the type of information to be extracted. This evaluation was performed using the probabilistic method described in section 8.

As data, a subset of the clinical trials descriptions available at clinicaltrials.gov was used. For the experiments, 1000 active clinical trials descriptions dealing with breast cancer were used. This corresponds to about 20,000 individual eligibility criteria.

For evaluation purposes, 40 randomly selected descriptions were manually annotated with the graph structure (represented as a set of triples) that the method aims to generate. The evaluation of the method is performed by graph matching between the extracted set of triples and the reference set of triples. Matching precision, recall and F1 score are computed for evaluation.

The descriptions are pre-processed to identify mentions of relevant entities using a Medical Concepts identifier, as described in Salah Aït-Mokhtar et al., "EURECA Deliverable 3.1 Initial prototype for concept extraction out of EHR free text," Technical Report, 2013, based on several Unified Medical Language System (UMLS) terminologies (SnomedCT, Loinc, ICD9). This medical concept identifier does not assign a score to the mentions' potential senses $s_k$. Nor does it perform any sense disambiguation. The Medical Concepts Identifier maps the mentions identified in the text to the concepts from UMLS (a rich medical meta-thesaurus available at https://uts.nlm.nih.gov//uts.html). Each mention in the text can be mapped to several UMLS concepts, which corresponds to the set of ambiguous term senses $S_m$. Each term sense is a complex structure containing concept unique identifier (CUI), Semantic type, and a number of other attributes (potentially coming from different terminologies).

Each sense $s_k \in S_m$ is represented with a vector of attributes $\Phi(s_k)=\{f_j\}$. The node to sense mapping parameter is computed as follows: $P(s_k|o)=\Sigma_{f_j \in \Phi(s_k)} P(s_k|f_j)P(f_j|o)$.

Disambiguation parameters are defined for each mention and each possible class of this mention. This may be estimated from the original terminology or from the data. In these experiments, each mention m is represented with a bag of words vector $w_m$, which allows integrating the optimization of the disambiguation model in unsupervised manner.

$$d(m_i \mid s_k) = \prod_{w \in w_{m_i}} p(w \mid s_k).$$

Word to sense parameters are initialized from data as follows:

$$p(w \mid s_k) = \frac{\text{count}(w, s_k)}{\text{count}(s_k)}.$$

The mentions graph used in the experiments integrates labeled syntactic dependencies as well as the layout distances (that allow compensating for potential parsing errors). The syntactic dependency structure is produced by the Xerox Incremental Parser (XIP), which does not provide any score associated to the produced structures. Therefore, the same weights are given to all the syntactic dependencies. The dependency structures produced by XIP are precise but often incomplete. Therefore, in order to compensate for incompleteness of the dependency structures, the set of dependencies is extended by possible dependency paths (restricted to 2 edges). The distances associated with the extended dependencies are set to the number of dependency edges participating in the dependency path.

The values of the layout distances are proportional to the actual layout distance (number of characters separating two mentions).

The distance values $d_i$ for each dimension i is transformed into weights as follows: $w_i = e^{-d_i}$.

In these experiments, structural distance is not considered, but it can readily be integrated, as described above.

Ontology node transition parameters t(e|s) and label mapping parameters $m_E(l_d|p)$ are initialized as defined in section 8.5 and optimized with the EM algorithm described in section 8.6.

Results

Table 1 gives the results both for the initialized model and optimized model.

TABLE 1

Experimental results for CTEC use case

| Model | F1 score | Recall | Precision |
|---|---|---|---|
| initialized model | 0.62 | 0.63 | 0.61 |
| optimized model | 0.65 | 0.61 | 0.70 |

It can be seen that, even without any optimization of the parameters, the model is capable of producing acceptable results. This is partly due to the rich sense representation which is available for most medical use cases due to the UMLS.

Some improvements are seen after optimization of the label alignment parameters and ontology node transition parameters. In particular, these lead to an improvement in precision, although a slight decrease in recall, leading to an overall better F1 score.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for extracting a relations graph, comprising:
providing an ontology of elements in the form of a graph in which nodes represent entity classes and edges connecting the nodes represent properties of the entity classes, at least one of the properties being associated with a constraint which defines a range of values for the respective property to take without incurring a constraint cost;
receiving input text in which entity mentions are identified;
identifying an optimal set of alignments between a subgraph of the ontology graph and the identified entity mentions in the input text, each of the alignments in the optimal set of alignments mapping one of identified entity mentions to a node in the subgraph, the optimal set of alignments being identified by optimizing a function of the constraint costs incurred by alignments in the optimal set of alignments for which the respective property does not take a value within the range of values and a distance measure computed over the set of alignments, the optimizing of the function comprising identifying a subgraph of the ontology and a graph linking mentions in the text for which a combination of the distance measure and the constraint costs is minimal; and
generating the relations graph based on the optimal set of alignments, the relations graph representing a linked set of relations instantiating the subgraph of the ontology, and where the subgraph of the ontology includes a node that is not aligned to any of the entity mentions, including an implicit mention in the relations graph corresponding to that subgraph node;
at least one of the identifying of the optimal set of alignments and the generating of the relations graph is performed with a processor.

2. The method of claim 1, wherein the method comprises identifying the entity mentions in the input text.

3. The method of claim 2, wherein the identifying of the entity mentions in the input text comprises matching text strings in the input text to entities in a domain-specific resource, each of the entities in the domain-specific resource being associated with at least one sense, entity mentions matching entities in the domain-specific resource that are associated with more than one sense being labeled with more than one sense.

4. The method of claim 3, wherein the identifying of the optimal set of alignments comprises, for an entity mention which matches an entity in the domain-specific resource that is associated with more than one sense, aligning the entity mention with an entity class corresponding to a single one of the senses.

5. The method of claim 1, wherein the identifying of the optimal set of alignments comprises computing a similarity function between the entity mentions in the text and the entity classes in the ontology.

6. The method of claim 1, wherein the optimizing of the function comprises optimizing a dual objective function which is function of a combination of:
a probability of generating an aligned subgraph instance given the identified set of mentions in the input text and the ontology graph; and
a probability that the constraints are valid in the subgraph instance.

7. The method of claim 1, wherein the method further includes learning parameters of the function on a training set of text samples.

8. The method of claim 1, further comprising outputting the relations graph or information based thereon.

9. The method of claim 1, wherein the method further comprises for each of the identified entity mentions, computing similarity scores between labels of senses of the entity mention and labels of the ontology classes and properties in the ontology, and where none of the similarity scores for the entity mention meets a threshold, aligning the entity mention to an artificial node in the ontology.

10. The method of claim 1 wherein the relations graph comprises a set of triples of the form <S,P,O>, where S is the subject of the triple and refers to an entity, P is a property that represents an attribute or a relation, and O is the object of the triple, which is the value of the attribute or the entity to which the subject of the triple is linked.

11. A computer program product comprising a non-transitory recording medium storing instructions, which when executed on a computer, perform the method of claim 1.

12. A method for extracting a relations graph, comprising:
providing an ontology of elements in the form of a graph in which nodes represent entity classes and edges connecting the nodes represent properties of the entity classes, at least one of the properties being associated with a constraint which defines a range of values for the respective property to take without incurring a constraint cost;
receiving input text in which entity mentions are identified;
identifying an optimal set of alignments between a subgraph of the ontology graph and the identified entity mentions in the input text, the optimal set of alignments optimizing a function of the constraint costs incurred by the alignments in the set when the at least one property does not take a value in the range of values and a distance measure for the set of alignments, the distance measure for the set of alignments being computed by:

for each of a plurality of pairs of consistent alignments in the set of alignments, computing a distance measure for the pair of consistent alignments, the distance measure being a multidimensional distance which is a combination of distance components of at least two dimensions; and combining the computed distance measures to generate a distance measure for the set of alignments; and generating the relations graph based on the optimal set of alignments, the relations graph representing a linked set of relations instantiating the subgraph of the ontology, and where the subgraph of the ontology includes a node that is not aligned to any of the entity mentions, including an implicit mention in the relations graph corresponding to that subgraph node;

at least one of the identifying of the optimal set of alignments and the generating of the relations graph is performed with a processor.

13. The method of claim 12, wherein the distance component dimensions are selected from:

a linguistic dimension based on the entity mentions in the pair of alignments;

an ontological dimension based on the ontology elements in the pair of alignments;

a document structure dimension which includes distances between nodes in the document structure;

a linguistic-ontological dimension based on one of the entity mentions in the pair of alignments and the ontology element in the same alignment; and combinations thereof.

14. The method of claim 13, wherein the ontological dimension comprises a length of a path between the two ontological elements.

15. The method of claim 12, wherein multidimensional distance is a combination of distance components of at least three dimensions.

16. A system for extracting a relations graph, comprising:

memory which stores an ontology of elements in the form of a graph in which nodes represent entity classes and edges connecting the nodes represent properties of the entity classes, at least one of the properties being associated with a constraint which defines a range of values for the respective property to take without incurring a constraint cost;

a preprocessor which identifies entity mentions in an input text;

a graphing component which generates the relations graph based on the identified entity mentions and the ontology, the graphing component comprising:

an alignment component which generates alignments between entity mentions and the ontology, a cost optimizer which identifies an optimal set of alignments between a subgraph of the ontology graph and at least a subset of the identified entity mentions in the input text, the optimal set of alignments optimizing a function of the constraint costs incurred by the alignments in the set and a distance measure computed over the set of alignments, a set of alignments incurring a constraint cost when at least one of the at least one properties takes a value which is not in the defined range of values, a relations graph generator which generates the relations graph based on the optimal set of alignments, the relations graph representing a linked set of relations instantiating the subgraph of the ontology, and where the subgraph of the ontology includes a node that is not aligned to any of the entity mentions, including an implicit mention in the relations graph corresponding to that subgraph node, and at least one of:

a querying component which queries an information source with relations extracted from the relations graph, and an update component which updates an information source based on a relation extracted from the relations graph; and a processor which implements the preprocessor, graphing component, alignment component, cost optimizer, and relations graph generator.

17. A method for extracting a relations graph, comprising:

providing an ontology in the form of a graph in which nodes represent entity classes and edges connecting the nodes represent properties of the entity classes, at least some of the properties being associated with a constraint which defines a range of values for the respective property to take without incurring a constraint cost;

receiving text in which entity mentions are identified;

identifying candidate alignments between each of the identified entity mentions and nodes of the ontology based on similarity between senses of the entity mentions and labels of the nodes, the ontology including an artificial node for alignment with an entity mention that does have a sense label which meets a threshold similarity with any of the labels of the nodes;

identifying an optimal set of the alignments for a subgraph of the ontology, the optimal set of alignments optimizing a function of the constraint costs incurred by the alignments in the set and a multi-dimensional distance measure computed over the set of alignments, the optimizing of the function comprising optimizing a dual objective function which is function of a combination of:

a probability of generating an aligned subgraph instance given the identified set of mentions in the input text and the ontology graph; and a probability that the constraints are valid in the subgraph instance; and instantiating the subgraph of the ontology as the relations graph based on the optimal set of alignments, the relations graph including nodes connected by edges, the nodes representing entity mentions and the edges representing relations between nodes, and where the subgraph of the ontology includes a node that is not aligned to one of the nodes in the relations graph, including a node in the relations graph corresponding to an implicit mention of that subgraph node;

at least one of the identifying of the optimal set of alignments and the instantiating the subgraph as the relations graph is performed with a processor.

18. The method of claim 17, wherein the optimizing of the function comprises identifying a subgraph of the ontology and a graph linking mentions in the text for which a combination of the distance measure and the constraint costs is minimal.

* * * * *